United States Patent [19]

Wang

[11] Patent Number: 5,956,521
[45] Date of Patent: Sep. 21, 1999

[54] SYSTEM FOR UNIVERSAL ELECTRONIC MAIL DELIVERY WHERE MESSAGING DEVICES ARE NOTIFIED USING A PARTICULAR DIALING, RINGING, AND HANGING-UP PATTERN

[76] Inventor: Kevin Kuan-Pin Wang, 11867 Woodhill Ct., Cupertino, Calif. 95014

[21] Appl. No.: 08/656,651

[22] Filed: May 31, 1996

Related U.S. Application Data

[63] Continuation-in-part of application No. 08/494,652, Jun. 26, 1995, Pat. No. 5,757,891.
[51] Int. Cl.⁶ .................................................. G06F 15/16
[52] U.S. Cl. .......................... 395/855; 395/823; 395/853
[58] Field of Search ........................ 395/200.32, 200.36, 395/200.33, 200.37, 200.45, 823, 853, 855; 379/88, 93.05, 198, 93.24, 100.09, 113, 265

[56] References Cited

U.S. PATENT DOCUMENTS

| | | | |
|---|---|---|---|
| 4,451,701 | 5/1984 | Bendig | 379/93.25 |
| 4,630,196 | 12/1986 | Bednar, Jr. et al. | 395/200.32 |
| 4,757,267 | 7/1988 | Riskin | 379/113 |
| 4,837,797 | 6/1989 | Freeny, Jr. | 379/93.17 |
| 4,924,496 | 5/1990 | Figa et al. | 379/142 |
| 5,003,580 | 3/1991 | Duong et al. | 379/93.09 |
| 5,014,300 | 5/1991 | Harvath et al. | 379/100.09 |
| 5,127,087 | 6/1992 | Kasiraj et al. | 395/200.36 |
| 5,130,977 | 7/1992 | May et al. | 370/422 |
| 5,138,653 | 8/1992 | Le Clereq | 379/93.24 |
| 5,163,156 | 11/1992 | Leung et al. | 395/200.45 |
| 5,164,982 | 11/1992 | Davis | 379/93.17 |
| 5,245,651 | 9/1993 | Takashima et al. | 379/93.23 |
| 5,293,250 | 3/1994 | Okumura et al. | 358/402 |
| 5,333,152 | 7/1994 | Wilber | 379/102.04 |
| 5,379,340 | 1/1995 | Overend et al. | 379/93.24 |
| 5,426,594 | 6/1995 | Wright et al. | 395/200.36 |
| 5,467,385 | 11/1995 | Reuben et al. | 379/88 |
| 5,483,466 | 1/1996 | Kawahara et al. | 395/200.33 |
| 5,530,744 | 6/1996 | Charalambous et al. | 379/265 |
| 5,535,407 | 7/1996 | Yanagawa et al. | 705/39 |
| 5,555,100 | 9/1996 | Bloomfield et al. | 358/402 |
| 5,596,573 | 1/1997 | Bertland | 370/474 |
| 5,627,764 | 5/1997 | Schutzman et al. | 395/200.37 |
| 5,684,862 | 11/1997 | Finnigan | 379/88 |
| 5,727,047 | 3/1998 | Bently et al. | 379/93.05 |
| 5,734,901 | 3/1998 | Sidhu et al. | 395/680 |
| 5,737,400 | 4/1998 | Bagchi et al. | 379/198 |
| 5,742,905 | 4/1998 | Pepe et al. | 455/461 |
| 5,754,778 | 5/1998 | Shoujima | 395/200.36 |
| 5,799,071 | 8/1998 | Azar et al. | 379/113 |

OTHER PUBLICATIONS

Krol, Ed, "The Whole Internet User'Guide & Catalog", O'Reilly & Associates, Inc., May 1993, pp. 19–30, 91–100 and 115–126.

Primary Examiner—Thomas C. Lee
Assistant Examiner—Chien Yuan
Attorney, Agent, or Firm—Claude A. S. Hamrick; Oppenheimer W. Donnelly; Emil Chang

[57] ABSTRACT

A system for facilitating, sending and receiving e-mail messages is disclosed. This e-mail system is supported by one or more main servers and a plurality of regional servers geographically distributed in populated areas, and are interconnected via a computer network such as the internet. An incoming e-mail message under this system is first processed and packaged by the main server to allow tracking of this message. The packaged message is then sent to the designated local server via a regional server. The local server receives the e-mail message and notifies or delivers the message to a client (user) e-mail device through one of several available notification methods. The e-mail device is a novel device designed to send and receive e-mail messages. It is a low cost device that may be a stand-alone device, a part of a multi-function device, or a part of a computer expansion card. The servers of the present invention can be maintained and operated remotely.

21 Claims, 18 Drawing Sheets

Fig. 5

Registration Process:
    get machine ID
    get security code
    get notification code from e-mail device
    get phone number for e-mail device
    search for the phone number of the
        corresponding local server
    send local server phone number to
        e-mail device
    update tables for this client

Fig. 6a

Main_Mail_Process:
    Every x minutes
        Process_Incoming_Mail
        Process_Outgoing_Mail

Fig. 6b

Process_Outgoing_Mail:
    check for new outgoing mail every y minute
    if new outgoing mail found,
        for each outgoing mailbag
            decompress mailbag
            extract outgoing mail messages
            pass out outgoing messages
                to send mail utility

```
Confirm_process:
Every w minutes
    for each confirm[i]=true
        search confirmation mail message from local server[i];
        if confirmation found
            if not all mail message in mailbag[i]
                are delivered
                if elapsed time > max_elapse_time,
                    extract and place undelivered
                        mail message in delivery_failed
                        directory;
                    notify operator;
        if confirmation not found and
            elapse time > max_elapse time;
                notify operator;
```

Fig. 6d

```
Every x minutes
    get mailbag from regional server
    decompress mailbag                          Fig. 7a
    extract mail message from mailbag
    identify & place mail into recipient clients'
        m_box
```

```
Every x minutes
    For each client[i]
    if client[i], m_box is not empty
        case(notification method):              Fig. 7b
            notify_only:
                notify_process;
            call_back_mail_delivery:
                call_back_mail_delivery;
            direct_mail_delivery:
                direct_mail_delivery;
        end
```

Fig. 7c

```
Notify_process:
    get last_logon_time of client[i]
    check_new_mail for client[i]
    if no new mail, or if notification has been sent already, exit;
    else
label1: call (client[i] phone number)
        if busy; wait x minutes and goto label 1;
    detect_ring_tone for client[i]. x1 second & disconnect;
    wait w1 second;
    call (client[i] phone number); if busy; wait x minute and goto label 1;
    detect_ring_tone for client[i]. x2 second & disconnect;
    wait w2 second;
    call (client[i] phone number); if busy; wait x minute and goto label 1;
    detect_ring_tone for client[i]. x3 second & disconnect;
```

Fig. 7d

```
Call_Back_Mail_Delivery:
    try_counter=0;
label 2: Notify_Process;
    Set AutoAnswer for x period of time
    If client calls back within x period of time
        Begin
            Handshake;
            Exchange_Mail_File;
            Disconnect;
            Send_Confirmation To_Server;
            Send_Outgoing_Mail To_Server;
        end
    Else
        If try_counter > max_try
            Report error to server
        Else increment try_counter
            goto label 2
    end
```

Fig. 7e

```
Direct_Mail_Delivery:
    Try_counter=0
label 3: Call Client
    If no reponse from E-mail device
        increment try_counter
        If try_counter > max_try
            report error to server
        Else
            goto label 3
        end
    Else
        Handshake;
        Exchange_Mail_File;
        Disconnect;
        Send_Confirmation To_Server;
        Send_Outgoing_Mail To_Server;
    end
```

```
Exchange_Mail_Files:
    Retrieve outgoing mail from client e-mail device;
    Get available storage size on e-mail device;
    If incoming mail message > available storage size
        Repackage_Mail_Messages;
    Send incoming mail to e-mail device;
    Disconnect;
```

Fig. 7g

```
Repackage_Mail_Messages:
    Sort incoming mail in order of priority
    Select mail in order of priority up to available storage
        size and leave space for a system mail message
        indicating more mail messgae at the local server
```

Fig. 7h

```
Handshaking:
    Check security code
    If security code incorrect
        disconnect;
        report unmatched security code to server
    Else
        Check machine ID
        If machine ID incorrect
            disconnect;
            report unmatched machine ID to server;
        end
```

Fig. 7f

```
procedure Get_mail;
    check_card_status
    if busy wait                    // wait until it is not busy
    else
        begin
            check_inmail
            if not empty move the mail to host
            empty the inbox on card
            display_mail
        end
```

Fig. 8b

```
procedure Send_mail;
    check_card_status
    if busy wait                    // wait until it is not busy
    else
        begin
            check_outmail_space
            if space available, move the mail to card
            done
        end
```

Fig. 8c

SYSTEM FOR UNIVERSAL ELECTRONIC MAIL DELIVERY WHERE MESSAGING DEVICES ARE NOTIFIED USING A PARTICULAR DIALING, RINGING, AND HANGING-UP PATTERN

CROSS REFERENCE

This application is a continuation-in-part of U.S. application Ser. No. 08/494,652, filed Jun. 26, 1995, now U.S. Pat. No. 5,757,891 entitled "EverReady Telephonic Answering-Machine for Receiving and Delivering Electronic Messages".

BACKGROUND OF THE INVENTION

1. Field of the Invention

The present invention is generally related to systems for facilitating electronic messages over interconnected computer networks, and more particularly, a system for coordinating and delivering electronic mail messages directly to a novel device for sending and receiving electronic mail messages.

2. Description of the Prior Art

As more and more people have access to computers providing for electronic mail messaging capabilities via the internet or internal networks, electronic mail messages, commonly referred to as e-mail messages, are becoming an integral part of modern communication. The delivery of an e-mail message occurs virtually instantaneously and the recipient of an e-mail message can reply to the message within minutes of the receipt.

However, for the situation where a user is connected via a phone line to the network, special problems exist. In this scenario, e-mail communication requires certain hardware and software combination in order for the user to send and receive e-mail messages. Generally speaking, for connection to the internet via a phone line to a network server, the necessary hardware includes a computer and a communication device such as a modem. Software wise, a mail program for the sending and receiving of e-mail messages is needed. Additionally, there may be a monthly subscriber charge for connect time to the server imposed by a internet service provider if the user is not connected via a prepaid network. Overall, economically speaking, it can be a significant investment to have a computer set up for the sending and receiving of e-mail messages. Moreover, the necessary hardware and software are fairly complex and may be difficult to set up by a novice user. These barriers bar majority of people from communicating with e-mail messages.

Even if a user has a complete computer system setup for the sending and receiving of e-mail messages, there are problems with receiving the messages in a timely manner, with power consumption, and with security risks.

In order to receive e-mail messages in a timely manner, a user must either manually and periodically dial into a network server or program the computer to automatically and periodically dial into the server to check and retrieve new mail messages. The manual method is a time consuming and tedious process that distracts the user from productive use of his or her time. The automatic method requires that the computer be left on all of the time which wastes power and may incur telephone toll charges every time the computer calls the server. If the network server is programmed to call and deliver a new message to the user's computer upon receiving it, the user's computer must be left on all the time which again wastes power.

Moreover, whenever a computer is left on, there is a risk of security breach where there might be unauthorized access to the computer via either the phone line or from the keyboard by an unauthorized person and thereby compromising the user's computer system.

All in all, the above described factors prevents e-mail messages from being delivered to every household. Thus, a new e-mail system and a low cost device are needed to provide an universal e-mail messaging system capable of sending and receiving e-mail messages from and to every household.

SUMMARY OF THE INVENTION

It is therefore an object of the present invention to provide a method and apparatus for facilitating, sending, and receiving of e-mail messages through interconnected computer networks or telephone networks.

It is another object of the present invention to provide a low cost method and apparatus for transmitting and receiving e-mail messages.

It is yet another object of the present invention to provide a low cost method and apparatus for delivering e-mail messages incurring minimum telephone toll charges.

Briefly, a system for facilitating, sending and receiving e-mail messages is disclosed. This e-mail system is supported by one or more main servers and a plurality of regional servers geographically distributed in populated areas, and are interconnected via a computer network such as the internet. An incoming e-mail message under this system is first processed and packaged by the main server to allow tracking of this message. The packaged message is then sent to the designated local server via a regional server. The local server receives the e-mail message and notifies or delivers the message to a client (user) e-mail device through one of several available methods. These methods include direct mail delivery, call-back mail delivery, and notify-only. Under the notify-only method, the local server uses an optional ringing protocol to notify the e-mail device that there is a mail message waiting. Under the call-back delivery method, the local server uses the optional ringing protocol to notify the e-mail device, and the e-mail device then calls the local server to retrieve the message. Under the direct-delivery method, the local server calls the e-mail device and delivers the message. The e-mail device is a novel device designed to send and receive e-mail messages. It is a low cost device that may be a stand-alone device, a part of a multi-function device, or a part of a computer expansion card. The servers of the present invention can be maintained and operated remotely.

An advantage of the present invention is that it provides a method and apparatus for facilitating, sending, and receiving e-mail messages through interconnected computer networks and/or telephone networks.

Another advantage of the present invention is that it provides a low cost method and apparatus for transmitting and receiving e-mail messages.

Yet another advantage of the present invention is that it provides a low cost method and apparatus for delivering e-mail messages while minimizing telephone toll charges.

These and other objects and advantages of the present invention will no doubt become obvious to those of ordinary skill in the art after having read the following detailed description of the preferred embodiments.

IN THE DRAWINGS

FIG. 5 illustrates the steps for registering an e-mail device;

FIGS. 6a–6d show the pseudo code for the procedures residing on the main server for facilitating incoming and outgoing e-mail messages;

FIGS. 7a–7h show the pseudo code for the procedures residing on the local server for interacting with the main server and the e-mail device;

FIGS. 8b–8c illustrate the pseudo-code for the software residing on the computer system for operating the e-mail expansion card;

DETAILED DESCRIPTION OF THE PREFERRED EMBODIMENTS

Figure 1:
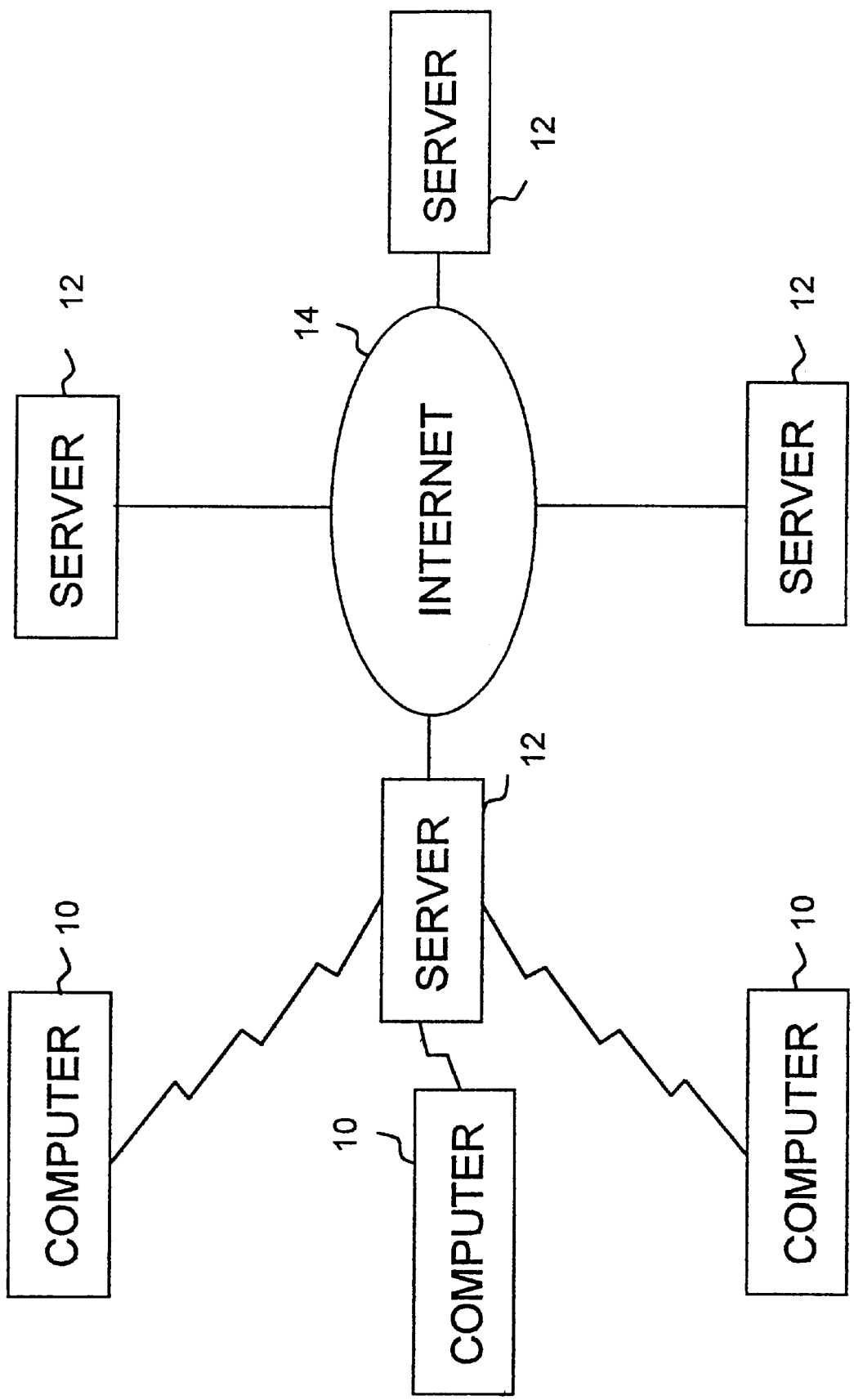
FIG. 1 illustrates a conceptual representation of the internet, a number of servers connected to the internet, and a number of computers connected to each server.

Referring to FIG. 1, the network infrastructure (for a network such as the internet) 14 is comprised of a number of interconnected servers 12 communicating with each other using a common protocol (such as TCP/IP). A user may communicate to another user by using a computer 10 that is connected to a server that has a point of presence on the network. The user may then send a mail message to another user having an address at a computer connected to another server. Under this paradigm, computers are needed at both ends of the communication link and the costs for the computers may be quite high. Additionally, local area network (LAN) is used extensively in the corporate environment to connect the user's computer to the mail server. The LAN allow the user's computer to communicate to mail server in real time which acts like a local post office in the e-mail world. Real time communication between the user computer and the server allows e-mail messages be sent and received in a timely manner. However, LAN or any existing real time network is expensive and difficult to install for small businesses and households. In these situations, a phone line (voice or ISDN) is used for most people to communicate with the mail server from their home computers. This approach reduces the cost at the price of real time connection. Without real time communication, the communication efficiency and convenience is greatly reduced.

Figure 2:
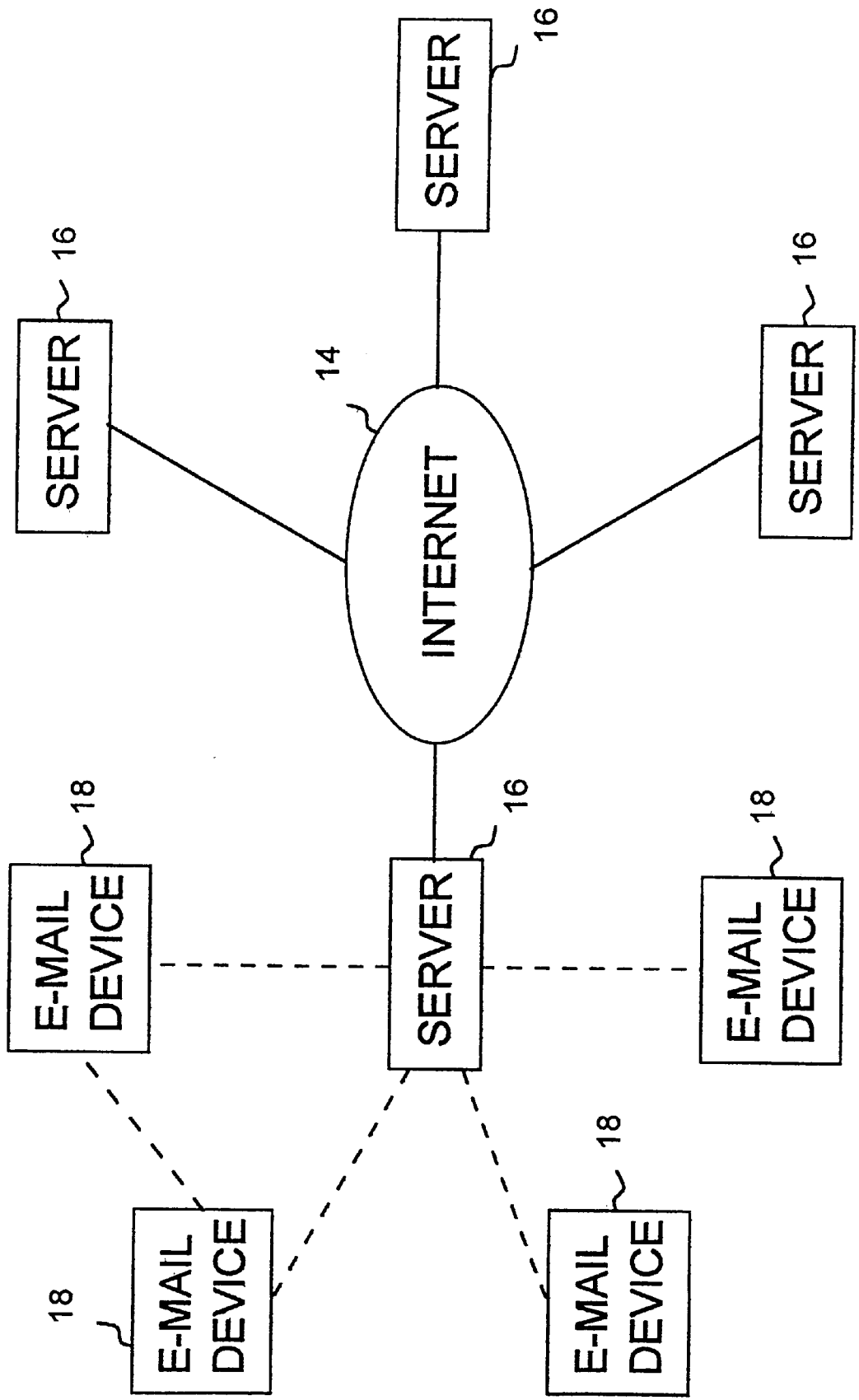
FIG. 2 illustrates a conceptual representation of the e-mail system of the present invention utilizing the internet, servers, and e-mail devices.

Referring to FIG. 2, an e-mail messaging system of the present invention utilizing the existing internet infrastructure is presented. The user can use a low cost e-mail messaging device 18 to communicate with a mail server 16 or another e-mail messaging device 18. The device in accordance with one embodiment of the present invention is simply a low cost stand alone device capable of receiving a notification that one or more e-mail messages have been received at the local server 16 waiting for retrieval. The device also is capable of identifying an incoming signal as an e-mail message signal, receives the incoming e-mail messages and stores them. Moreover, the device can provide the needed functional components for the user to compose an e-mail message and deliver the e-mail message to the local server or another e-mail device directly. The e-mail device uses minimum set of electronic components and consumes very low power when compared to the power consumption of a computer. It can be left on like an answer machine. There are also other possible embodiments of the e-mail device.

Figure 3:
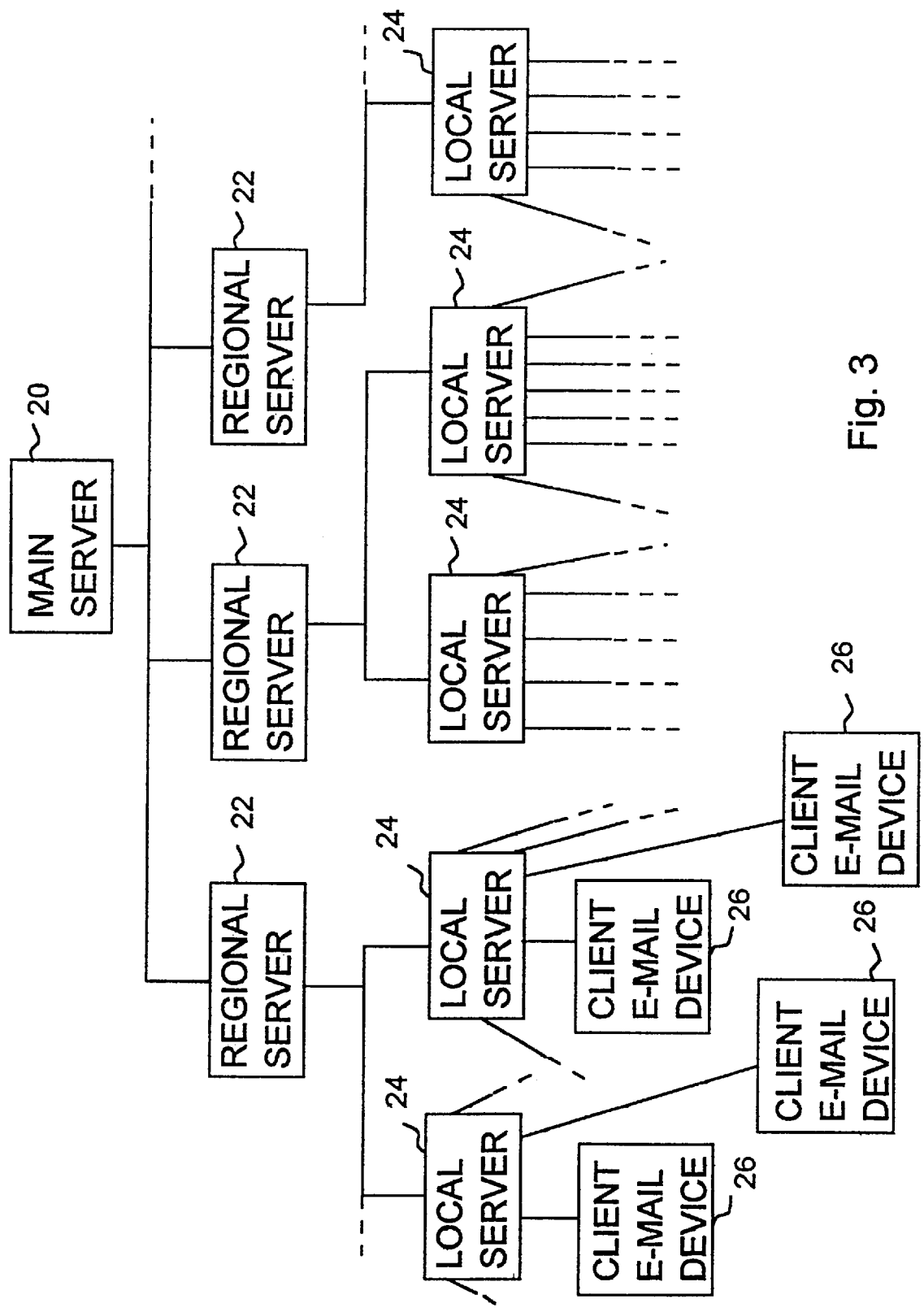
FIG. 3 shows a hierarchial relationship between the main server, regional servers, and local servers.

FIG. 3 illustrates the preferred hierarchy for the e-mail messaging system. At the top level, there is a main server 20 receiving e-mail messages from the internet network and sending e-mail messages originated from the client e-mail devices to the network. The main server may be one or more computers sharing a centralized database. The main server 20 distributes and receives e-mail messages from a number of regional servers 22. Each regional server 22 is designated to serve a particular geographical area and serves one or more local servers 24. The local servers 24 interact with the client e-mail devices 26 within its geographical area. The client device is designated to be a simple, low-cost electronic device suitable for home or business use, and it is further described infra.

To illustrate the message flow, the main server 20 receives an e-mail message, identifies the e-mail address, determines the regional server 22 for this e-mail message, and sends it to the corresponding regional server 22. The regional server may be designated to serve a city or a greater metropolitan area involving several area codes. After it receives a message, it forwards the message to the local server. A local server is designated for each sub-region and directly serves the clients and their e-mail devices. Implementation wise, a regional server and a local server may be logically separate systems residing on the same physical machine. Each local server is equipped with the necessary hardware and software to communicate with clients' e-mail devices.

Figure 4:
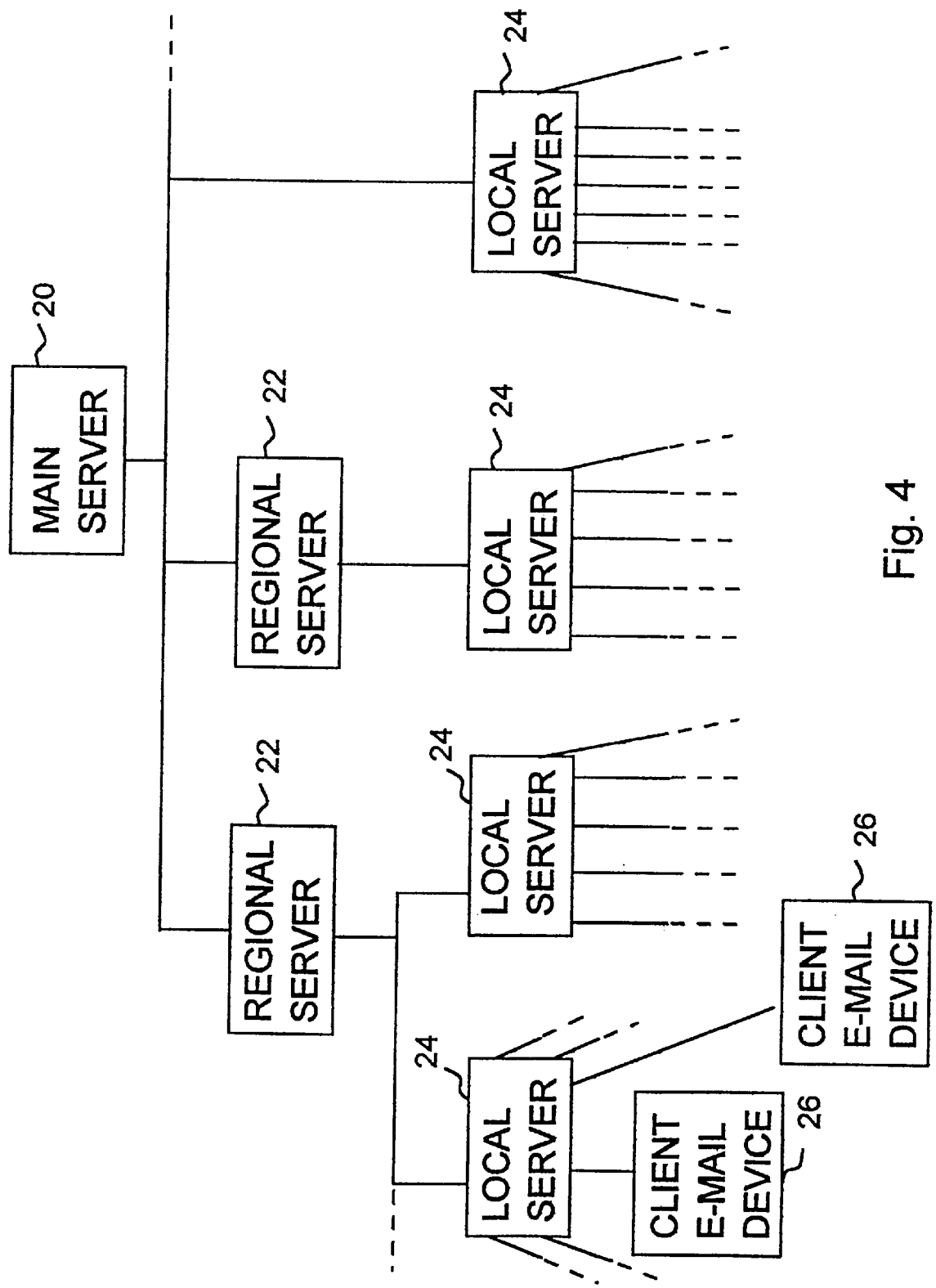
FIG. 4 shows another hierarchial relationship between the main server, regional servers, and local servers where the local servers may be connected directly to the main server.

In an alternate embodiment, referring to FIG. 4, the main server 20 may communicate directly with local servers to send and receive e-mail messages to and from the client e-mail devices.

Although the illustrated embodiments show a hierarchial structure, it is within the scope of the present invention to implement the present invention in a distributive structure.

In order to provide direct e-mail messages to each client, each client is identified by an unique e-mail address, and must be registered with the e-mail system in order for the e-mail system to interact with the e-mail device. Typically, the e-mail device is accessed via a local telephone line such as a voice, data or ISDN line.

FIG. 5 illustrates the steps for the registration process where an e-mail device (as operated by the client) dials a toll-free number, logs on the main server, and the main server performs the illustrated steps. First, the main server requests and obtains the machine identification number unique to the particular e-mail device. The machine identification number identifies the device type and also provides for theft prevention. Secondly, the main server gets the security code (password) entered by the user. The use of a security code minimizes the possibility that the mail messages being delivered or received by the wrong party. Next, the main server fetches the notification code from the e-mail device. The notification code is an optional ringing protocol used by the main server to provide a notice to the e-mail device through the use of ring tones without incurring telephone toll charges.

The phone number for connecting to the e-mail device is provided to the main server. For the given phone number, the main server finds the corresponding local server and its phone number, and sends this phone number to the e-mail device. The e-mail device stores it in its memory for future use. Finally, the main server completes the registration process by completing and inserting a new client information entry into the centralized database.

Main Server

To track information on the clients, the local servers, and the regional servers, two tables are maintained by the main server. In table one, each client's name, phone number, e-mail address, the local server for the client, and other administrative or accounting information are kept.

TABLE 1

| Client Name | E-Mail Addr | Local Server | Phone Number | Other Info. |
|---|---|---|---|---|
| John Smith | jsmith | 1 | (210) 231-1234 | |
| Bob Clinton | bclinton | 1 | (210) 231-7890 | |
| Al Goodman | agoodman | 2 | (123) 789-1234 | |
| Mike White | mwhite | 2 | (123) 789-4321 | |

Table two contains information for each local server, information such as the address of the regional server for the local server and the type of connection from the main server to the regional server.

TABLE 2

| Local Server | Regional Server Address (e-mail) | Connection Type |
|---|---|---|
| 1 | system@region1.com | Internet |
| 2 | postmaster@region2.com | (210) 111-1234 (leased line) |

For example, there are two local servers illustrated in table two. The regional server for local server one is connected to the main server via the internet, and the regional server for local server two is connected to the main server via a leased line for high speed communication. Other types of connection methods between the regional servers and the main server can be utilized as well (e.g. satellite) if they are economically feasible. Additional tables can be created and maintained as needed.

For the purpose of organizing incoming e-mail messages, a mailbox is dedicated to each client and maintained by the main server. The mailbox can be a file or any other type of indexable storage system.

Referring to FIG. 6a, the main server is instructed to check for and process incoming and outgoing mail messages every x minutes where x is a defined period of time which can be a function of the load on the system.

Referring to FIG. 6b, the steps for processing outgoing mail messages are illustrated. Outgoing mail messages come from clients of the e-mail system for delivery to other users on the net. This process is performed every so often to ensure mail is processed in a timely manner. If there is a new mailbag from a local server, the new mailbag is decompressed, and the mail messages are extracted from the mailbag and passed to the send mail utility. The send mail utility can be a common mail program (e.g. Unix Operating System sendmail utilities) with the capability of sending and receiving e-mail messages.

Figure 6C:
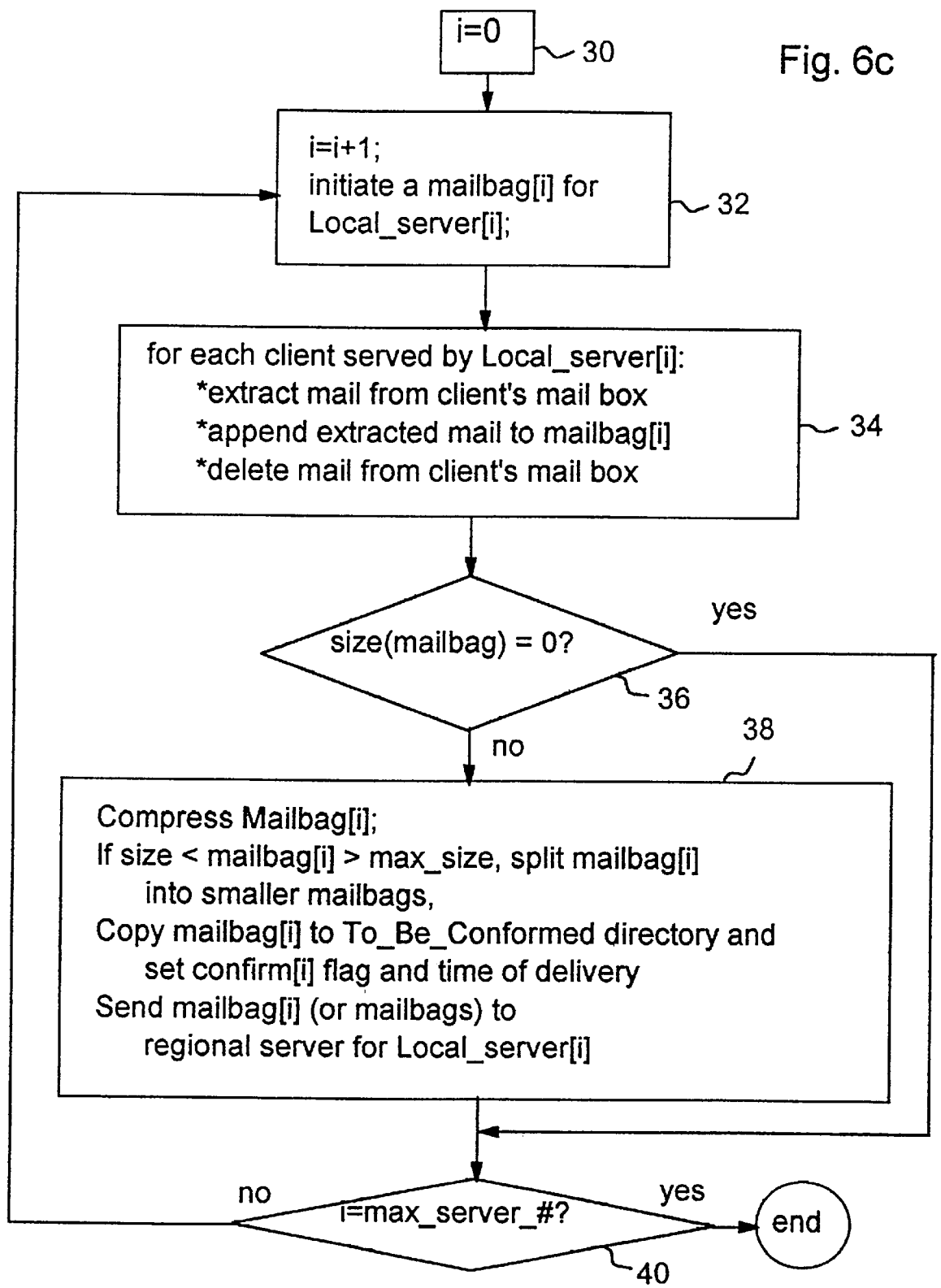

FIG. 6c illustrates the steps for processing incoming mail messages where a mailbag is prepared for each local server. The local servers are indexed consecutively starting with index equals one 30. For each local server, a new mailbag is initialized 32. For each client serviced by the particular local server, the client's mailbox is searched, and new messages are extracted and appended to the mailbag for the particular local server 34. The new mail messages are then deleted from the mailbox for the client 34.

If the mailbag is not empty, the mailbag is compressed, and a confirm flag is set 38. If the size of the mailbag after compression is greater than the maximum size allowed for mail delivery, the mailbag is split into two or more smaller mailbags. A copy of the mailbag(s) is then stored in a To-Be-Confirmed directory for later confirmation, and the mailbag(s) is sent to the regional server for the particular local server.

After all of the mailboxes for a particular local server have been processed, the process repeats until all of the local servers' mailbags have been processed.

The main server also performs a confirmation process to ensure that the mailbags and the individual mail messages have been received. Referring to FIG. 6d, the steps for the confirmation process is illustrated. Every so many minutes, the confirmation process is executed. For each confirm flag that is set (confirm [i]=true), the main server searches for a confirmation message from the corresponding local server. If a confirmation message is found and not all the mail messages have been delivered and the elapsed time is greater than the maximum allowed elapsed time, the undelivered mail message is placed in an undelivered mail directory and the operator is notified. If the confirmation message is not found and the elapsed time has exceeded a maximum allowed elapse time, the operator is notified. If all the mail messages are confirmed as successfully delivered, the mail bag is placed into archive.

Regional Server

The function of the regional server is to serve as an intermediary between the main server and the local servers. The regional server is configured to have the function of an ISP Point-of-Presence (like an internet service provider) in order to receive and send mail via the internet. It maintains a shell account and a mailbox for each of the local server it serves. The regional server interacts with its local servers to facilitate the handling of incoming and outgoing mailbags. The mail utilities commonly available with the operating system (e.g. Unix) of the regional server can be utilized to achieve the tasks described.

The regional server can be configured to operate as a local server as well.

Local Server

Each local server maintains a table of clients. For each client, referring to Table 3, the client's name, e-mail address, phone number, notification type, ringing protocol, security code, machine ID, and other miscellaneous information are kept.

TABLE 3

| Name | E-Mail Address | Phone Number | Notification Type | Ringing Code | Security Code | Machine ID |
|---|---|---|---|---|---|---|
| John Smith | jsmith | (210) 231-1234 | notify-only | 0.5/0.25 | 123 | 789 |
| Bob Clinton | bclinton | (210) 231-7890 | call-back | 0.3/0.5 | 456 | 111 |

There are three notification/delivery types: notify-only, call-back mail delivery, and direct mail delivery. In the notify-only notification method, the local server calls the client's e-mail device using the specified ringing protocol from the table. No connection is actually made between the local server and the e-mail device. The rings are set up in such a manner that the e-mail device is programmed to recognize the ring pattern and determine that a notification is being delivered by the local server. When the notification is successfully received, the e-mail device activates an indicator light on the e-mail device. The client/user can then retrieve the message at his or her convenience using the e-mail device or other means. If in the process of notifying the e-mail device, an actual connection is made, the e-mail device can be set to call the local server to retrieve the e-mail messages or messages can be directly delivered.

In the call-back mail delivery method, similar to the notify-only method, the ringing protocol is used to notify the client's e-mail device that there is one or more e-mail messages waiting at the local server. The notification causes the e-mail device to call the local server and retrieve the e-mail messages.

In the direct mail delivery method, the local server calls the e-mail device, connects with the e-mail device, and delivers the e-mail messages to the e-mail device. The client may designate any one of the three notification methods as long as it is supported by the e-mail device and the local server.

The optional ringing protocol is a method for the local server to provide notice to the e-mail device without incurring toll charges. It utilizes and controls the length of ring time and the length of time between rings. Using this method, a calling device (here the local server) dials the number, detects ring tone for x1 second(s), hangs up, waits for w1 second(s), dials the number again, detects ring tone for x2 second(s), and hangs up. The receiving device (here the e-mail device) upon detecting this particular ringing protocol determines that a notice is being delivered by a calling device, and accordingly executes a preprogrammed routine (if any). The ringing procedure of dial, detect, hang up, and wait is not limited by a specific number of iterations and may be repeated a number of times. In the preferred embodiment, this procedure is repeated three times, using x1, x2, x3 and w1, w2. The method may be simplified by setting w1 and w2 to have the same length of time. Other combinations are possible as well as long as the e-mail device is configured to detect and recognize the designated ringing protocol. In the preferred embodiment of the present invention, a ringing code, n/m, is used for each client where x1 is a constant, x2 equals x1+n, and x3 equals x1+n+m. Referring to Table 3, for client John Smith, a ringing code of 0.5/0.25 refers to x2 being x1+0.5 second and x3 being x1+0.5+0.25 second, where w1 and x1 are constants. Similarly, the ringing code for Bob Clinton is 0.3/0.5 which refers to x2 being x1+0.3, and x3 being x1+0.3+0.5, and w1 and x1 again being constants. Generally speaking, the ringing tone should not be very long. Note that generally speaking it is more reliable to use the difference between ring tones rather than timing the duration of each ring tone.

In utilizing the ringing protocol with communication switching devices in a central office where a switching device passes back a signal informing the calling device that the switching device is dialing and ringing the line, once the calling device receives such a signal, the calling device can determine the length of ring time and hang up accordingly. Other implementation of the above described method can be applied to other types of calling devices and/or switching devices as well.

A security code (client password) may be set by the client to provide additional security measures. In order to protect the e-mail device itself from theft (as well as the e-mail messages) a machine identification number (serial number) particular to each machine is used. Thus, if the e-mail device is ill-gotten by another, it will not work. The machine ID also allows the local server to identify the e-mail device machine type.

In facilitating mail delivery, the local server interacts with the regional server/main server and clients' e-mail devices.

In interacting with the regional server, referring to FIG. 7a, the local server checks for one or more new mailbags from the regional server every x minutes. If a new mailbag is found, the mailbag is decompressed, mail messages are extracted from the mailbag and placed into the mailbox for the particular client.

Referring to FIG. 7b, every so often each client's mailbox is checked to see if there are any e-mail messages need to be delivered. If the mailbox for the particular client is not empty, the e-mail message(s) in the mailbox is delivered via the designated delivery/notification method for the particular client, i.e., one of the available delivery/notification methods. For each of the delivery/notification methods, there is a corresponding procedure call.

For the notify-only method, referring to FIG. 7c, the last time the local server interacted with the client's e-mail device (logon time) is fetched. If no new mail has arrived since the last logon time, the process ends. If there is one or more new e-mail messages and no notification has been sent to clients' e-mail devices yet, the ringing protocol described above is applied. First the local server calls the client's e-mail device. If the client's phone line is busy, the local server waits a few minutes before attempting to call the e-mail device again. If the phone line is not busy, the local server, through its interfacing hardware, detects the ring tone for x1 period of time and hangs up, wait w1 period of time, and calls the e-mail device again. If the line is busy, the process starts over after waiting a certain period of time. Otherwise, the local server detects ring tone for x2 period of time and disconnects. The local server calls a third time, rings for x3 period of time and hangs up. This completes the notification process.

For the call-back mail delivery method, referring to FIG. 7d, the above described notification process is used, and the local server sets the hardware communication device in auto answer mode. If the client's e-mail device calls back before the end of a specified time period, a handshaking process is executed to verify the security code and the machine code. Then, any outgoing mail messages is retrieved from the e-mail device and any incoming mail is delivered to the e-mail device. When the file exchange process is completed, the line is disconnected, a confirmation signal on the successful delivery of the e-mail messages is sent to the main server via the regional server, and any outgoing mail messages is sent to the main server via the regional server as well. If the e-mail device does not call back after a set period of time and if the try-counter (that keeps count the number of tries) exceeds a maximum try value for the delivery of the messages, it is deemed that mail delivery has failed and an error messages is generated and sent to the regional server to forward to the main server. Otherwise, the try-counter is incremented and the program flow starts from label 2 again to repeat the process.

For the direct mail delivery method, referring to FIG. 7e, a try-counter is initialized and the local server calls the client's e-mail device. If the e-mail device fails to respond, the try-counter is incremented; and if the try-counter is greater than a maximum try-counter value, an error is deemed to have occurred and an error message is generated and sent to the server. Otherwise, the process is repeated by branching off to label 3. If the e-mail device responds, the process for handshaking, exchanging of any outgoing and any incoming e-mail messages, sending of a confirmation signal, and sending of any outgoing mailbag as above described for the call-back mail delivery process is executed.

In the handshaking process, referring to FIG. 7f, the security code is first verified. If the security code is incorrect, the handshaking process stops and down stream procedures are not executed. This condition is reported to the regional server and the main server for special handling. The machine ID verification process of the e-mail device is similar to the security code verification process.

In the exchange-mail-files process, referring to FIG. 7g, the local server connects to the e-mail device and retrieves any outgoing mail from the e-mail device. Next, the amount of available storage in the e-mail device is determined. If the size of the incoming mail messages is greater than the available storage size, the incoming mail messages are repackaged. The repackaged incoming mail is then sent to the e-mail device, and the process ends. In repackaging the incoming mail messages, referring to FIG. 7h, the incoming mail messages are sorted in order of priority where priority is determined by factors such as the priority code of the message and the date and time stamp of the message. The ordered messages are then selected in order of priority up to the available storage space but leaving space for a system e-mail message to the client that there are additional messages waiting for retrieval or delivery.

A priority code of the present invention can be included as part of the e-mail address itself by comparing a number in the e-mail address itself to the security code. For example, for jsmith@emailsys.com having a security code of "124", an e-mail address such as "jsmith_123@emailsys.com" would have a higher priority than an e-mail address such as "jsmith_456@emailsys.com" because the number "123" is closer to the security code of "124" than the number "456" is to "124". Thus, by having a single e-mail address, the owner of the e-mail address can give out e-mail addresses with different priority codes.

Client E-Mail Device—Software

The client's e-mail device has both a hardware component as well as a software component. The e-mail device can communicate with the local server, regional server, main server, or another e-mail device (for peer-to-peer communication).

Referring to Appendix A, the software pseudo-code for the client's e-mail device is illustrated. When the device is first turned on, a power-on self-test is executed. If there is a fatal failure, the program flow branches to the Fatal_Error_ Stop label, sets the fatal error indicator, and halts the system. If a minor failure occurred, the program flow branches to the Warning_Code label, sets a warning code indicator and resumes the program flow. Next, the phone line status is checked. If it is busy, the device will wait until the line is not busy. The e-mail device is then placed in auto-answer mode and the registers for the device are initialized for operation. If there is any failure during this initialization process, a warning code is posted. After the initialization process, the software continuously loops to check for an interrupt from the interrupt registers. If an interrupt is found, the program branches to the Interrupt_Service routine. The Interrupt_ Service routine reads the interrupt register, determines the interrupt type, and branches to the corresponding interrupt routine.

An interrupt may be caused by one of the several subsystems, where the types of interrupts include registration request interrupt, call-back mail delivery interrupt, dial server interrupt (which calls the same procedure as that of the call-back mail delivery interrupt), incoming mail delivery interrupt, and transfer-abort interrupt.

If the call-back interrupt flag is set, the call-server routine is executed where the communication module is set to dial the local server phone number and execute an In_Mail routine.

The In-Mail routine first performs handshaking with the local server communication module. It then sends out any outgoing mail messages prepared by the client, and requests and receives a confirmation signal from the local server. If the confirmation signal from the local server is incorrect, the outgoing mail messages are sent again by branching the program flow to label SendM. Otherwise, the device is instructed to receive incoming mail messages. If the incoming mail messages are not received correctly, a confirmation signal is generated to sent to the local server which would cause the local server to deliver the mail messages again. When the messages are correctly received, the mail indicator is set.

In the handshaking routine, the device receives the security code from the local server, verifies the code, and branches to the Bye routine if it is incorrect. Similarly, the device receives the machine ID, verifies the ID, and goes to the Bye routine if it is incorrect. The device then sends the security code and the available storage size to the local server.

Back to the Interrupt_Service routine, if the Incoming_ Mail interrupt flag is set, the program flow branches to the In_Mail routine as described above.

If the Registration_Request interrupt flag is set, this flag indicates that the client has placed the device in registration mode in order to register with the main server. This process is generally executed when the device is being set up for the first time or when the device has been moved to a new location. The program flow branches to the Registration_ Request routine, where the device dials a designated phone number for registration. Generally, this is a 800 toll free number connected to the main server. When connected, the device delivers the machine ID, the security code, and the client's phone number to the main server. The main server determines the particular local server for serving the client's e-mail device based upon the given phone number. The phone number for the particular local server is sent to the client device, and the client device retains the number in memory for later use.

The dial_server interrupt flag is set by the client to send and retrieve mail messages. Like the call_back interrupt, it calls the call_server routine.

In the case where the local server is using the direct mail delivery method, the Incoming-mail flag is set and the In_Mail routine is executed as described above.

In the case where a request has been made to disconnect the line, the Transfer-Abort flag is set which causes any phone connection to be disconnected.

In the case where the hardware for the e-mail device is part of another computer system (e.g. personal computer system) in the form of an expansion card or a part of an expansion card, the interface with the e-mail device can be integrated with a mail program of the computer.

Client E-Mail Device—Hardware

The hardware component of the e-mail device may be embodied in several different manners. In one form, the e-mail device is a low-cost stand alone device directly connected to the phone line before the phone line is connected to other devices (e.g. answering machine, fax machine, etc.). The stand-alone embodiment interacts with the e-mail system as described above. More particularly, the software for the e-mail device as described above is configured and stored in the ROM of the e-mail device.

Figure 8A:
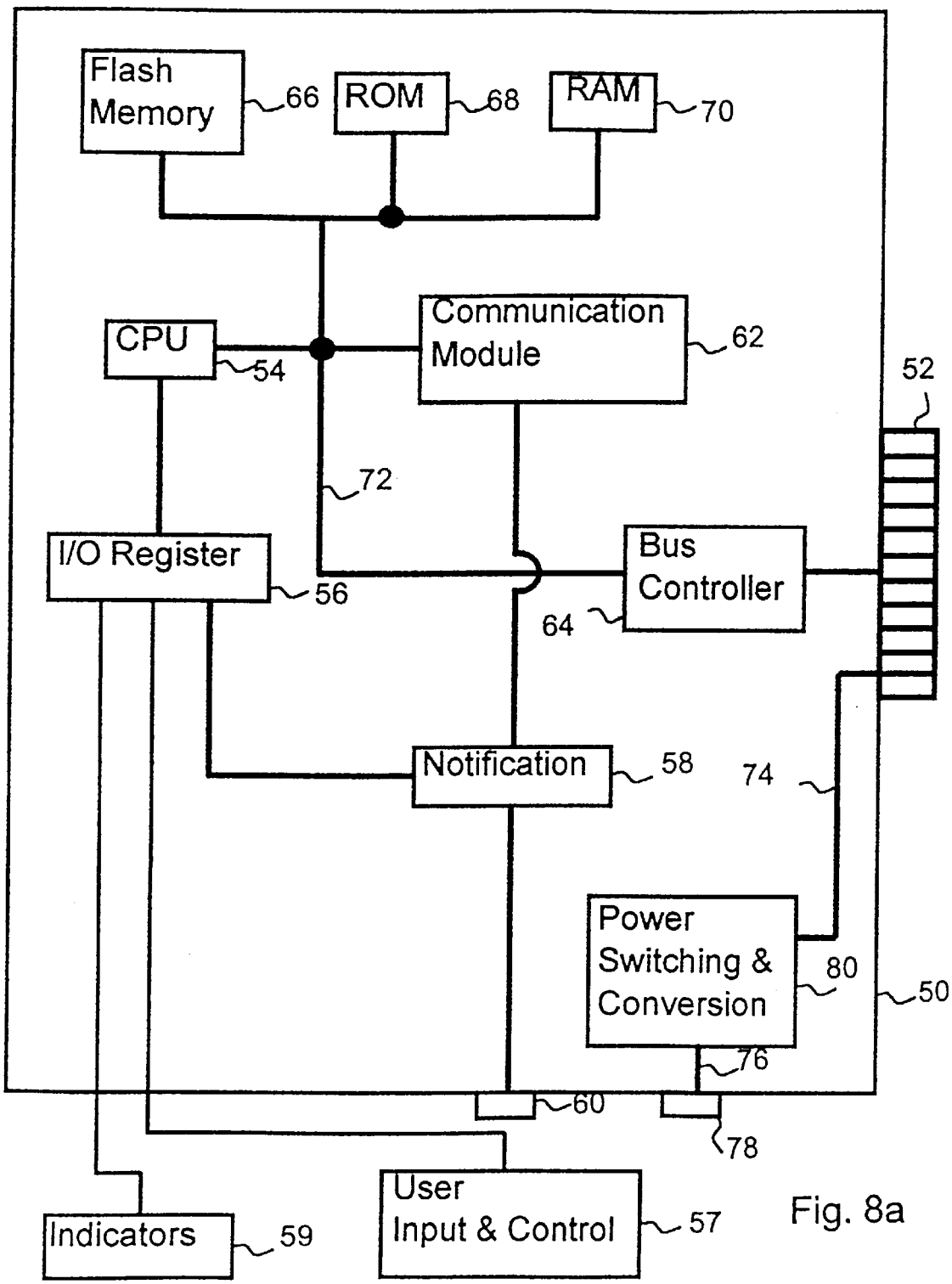
FIG. 8a shows a computer expansion card implementation of the e-mail device.

In another hardware embodiment, the e-mail device is an integral part of a computer expansion card having power supplied from two sources, the computer system itself or an external power supply. Referring to FIG. 8a, an expansion card 50 having an edge connector 52 is illustrated. The expansion card is insertable into an edge connector slot connected to the bus of a computer system. The expansion card includes a CPU 54 (or microcontroller) directly polling an I/O register 56 that is communicatively connected to a notification module 58. The I/O register 56 receives information from the notification module 58 and the user input and control device 57 (which can be a keyboard, a keypad, dip switches, etc.) for entering security code, e-mail messages, or other inputs, and generates signals for indicators 59 to indicate the status of any messages and the e-mail device. The notification module sends and receives information via a phone line connection and interacts with the communication module 62. When the expansion card is inserted into the computer system, a bus controller 64 controls the data flow to and from the computer system (not shown) via the edge connectors 52. Information is passed between the flash memory 66, the ROM 68, the RAM 70, the CPU 54, and the communication module 62 through an internal bus 72. The communication module can be a fax/modem chipset. The expansion card 50 may be powered by one of two sources, power from the computer system via trace 74 or power from an external source via trace 76 and power jack 78. The power switching and conversion module 80 detects power from one of the two sources, performs any power conversion from one voltage level to another voltage level if it is needed, and routes the power to the components on the expansion card 50. The power detection and switching is automatically performed without interruption to the operation of the e-mail device. Thus, no interruption of operation would occur if power is switched in the midst of sending or receiving e-mail messages.

In this embodiment, when the computer system is on, the expansion card may be controlled and operated by the software of the computer system. When the computer system is off, unattended, or not controlled by the software of the computer system, the expansion card obtains its power supply from an external source and operates in accordance with the software described above.

Mailing program on the computer system having the e-mail expansion card would have software routes for sending and retrieving e-mail messages between the computer system and the e-mail expansion card. Referring to FIG. 8b, the pseudo-code for the computer system to retrieve e-mail messages from the expansion card is illustrated. The status of the card is first verified. If the card is not busy, the in-mail message flag (indicating the existence of new e-mail messages) is checked. If there is a new message, the message is transferred to the computer system and the storage area is cleared. Then, the message is displayed on the computer screen of the computer system. Referring to FIG. 8c, the pseudo-code for the computer system to transfer prepared e-mail messages to the expansion card for outbound is illustrated. If the card status is not busy and if there is enough storage space to store all of the e-mail messages, the e-mail messages are transferred to the expansion card and the computer can be turned off. If the storage on the card is insufficient, the user is informed to wait until the messages are sent before turning the computer off.

Figure 9A:
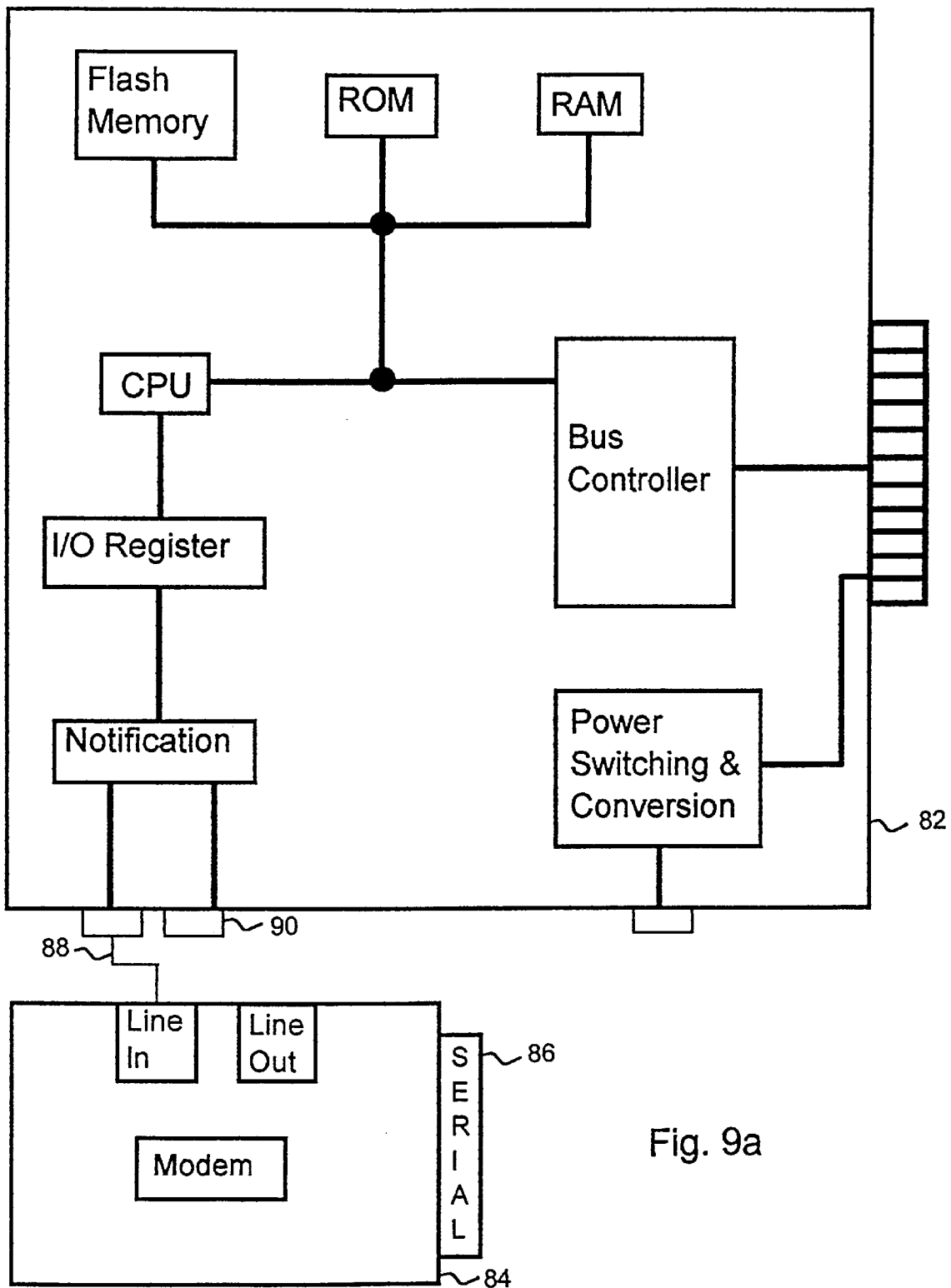
FIGS. 9a–9d show other computer expansion card implementations of the e-mail device used in conjunction with a fax/modem.

In yet another hardware embodiment, referring to FIG. 9a, the communication module of FIG. 8a is a commonly available external fax/modem. For an external modem, its serial port 86 may be connected to the serial port of the computer system. The expansion card 82 (now without the communication module) communicates with the modem 84 through serial port 86. The notification device may be connected to the modem via standard phone jacks and a phone line 88. In this embodiment, the cost of the expansion board now without the communication module is reduced. A phone line signal would come in on jack 90 and be processed in the same manner as described above.

Figure 9B:
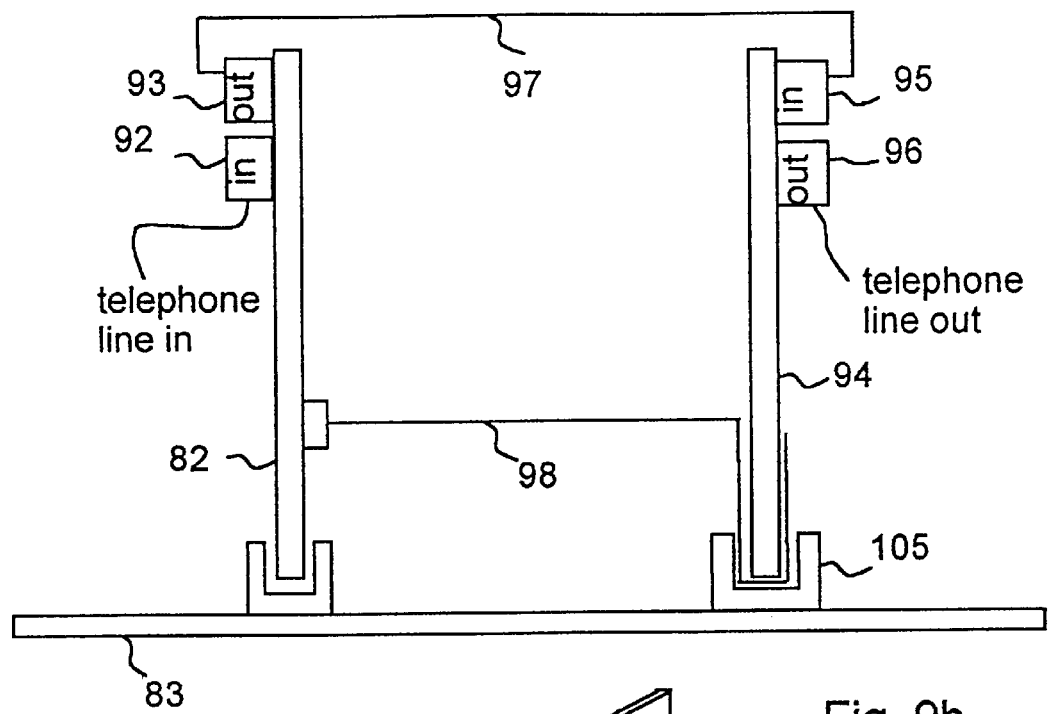
Figure 9C:
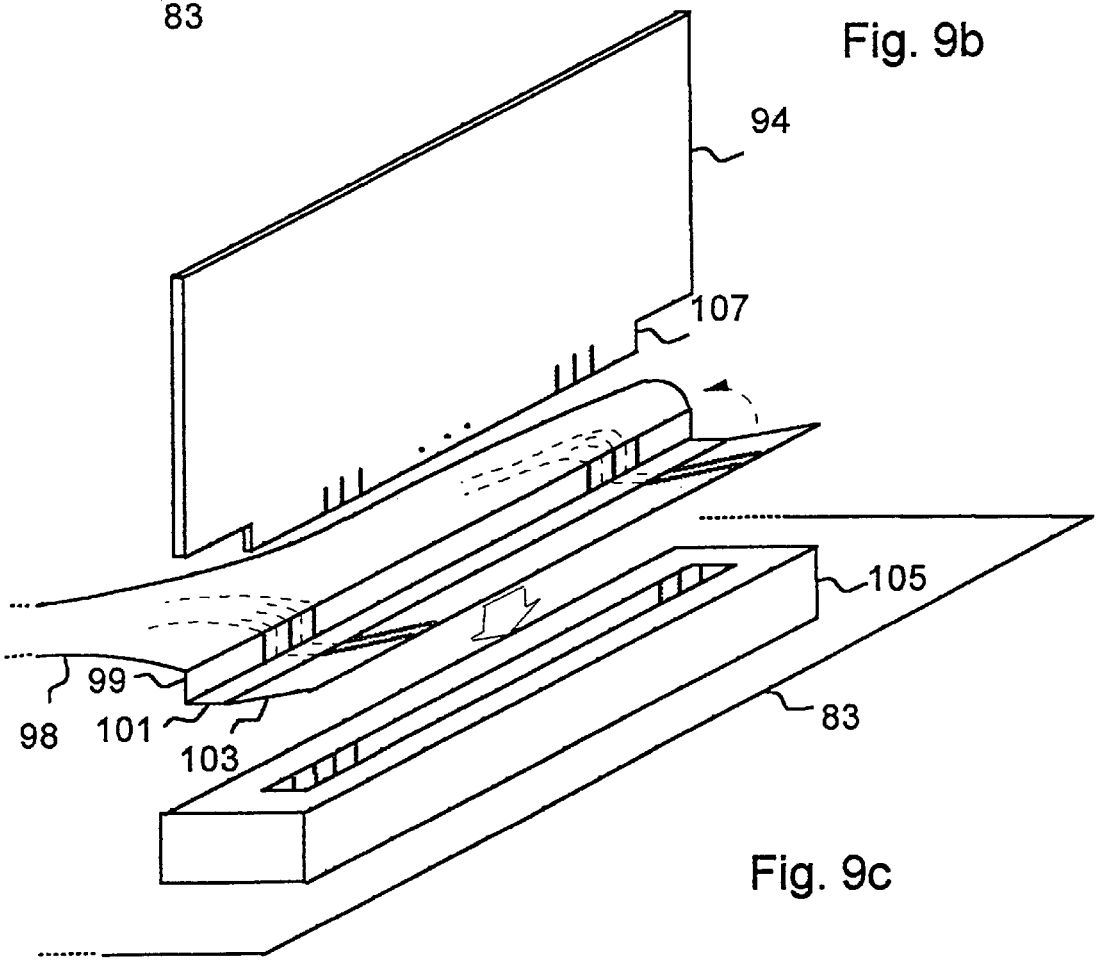

FIG. 9b illustrates the embodiment for an internal modem where the e-mail expansion card 82 is mounted on the mother board 83 and has a phone jack 92 for receiving the phone line and phone signal and a phone jack 93 for passing the phone signal to the modem card 94 via phone line 97. The modem card 94 is mounted on the mother board 83 as well and receives the phone signal at phone jack 95 and passes the phone signal out at phone jack 96. The e-mail expansion card directly communicates with the modem card via ribbon 98. Ribbon 98 on one end is communicatively attached to the expansion card 82 and on the other end it can be a ribbon cable inserted into a bus connector slot 105 of the mother board along with the modem card. FIG. 9c shows that the ribbon cable 98 at the end having three contact surfaces 99, 101, and 103. Contact surface 103 makes electrical contacts with selected tabs on one side 107 of the edge connector of the modem card 94 and selected tabs on one side of the bus slot 105. Contact surface 101 makes physical contact (but no electrical contact) with the bottom of the bus connector slot 105. Contact surface 99 makes electrical contact with selected tabs on the other side of the edge connector of the modem card 94 and selected tabs on one side of the bus slot 105. In this manner, the modem card can communicate with the computer system and the e-mail expansion card, and the e-mail expansion card is allowed a greater amount of direct control over the modem card. In the case where power is being supplied by an external source, the power can be supplied to the modem card through certain of the selected tabs.

Note that in both FIGS. 9a and 9b, the e-mail expansion card optionally can have complete control over the external or internal fax/modem where all communication between the CPU and the fax/modem has to pass through the e-mail expansion card. In another word, the e-mail expansion card can encapsulate the fax/modem. In FIG. 9b, encapsulating can be achieved by providing a ribbon cable having printed traces on one side and non-conductive material on the other side. The modem card nevertheless is inserted into the bus slot but it does not communicate through the traces in the bus slot. Conventional methods can be applied as well where the e-mail expansion card and the internal modem card are connected via simple ribbon and connectors on each card.

Figure 9D:
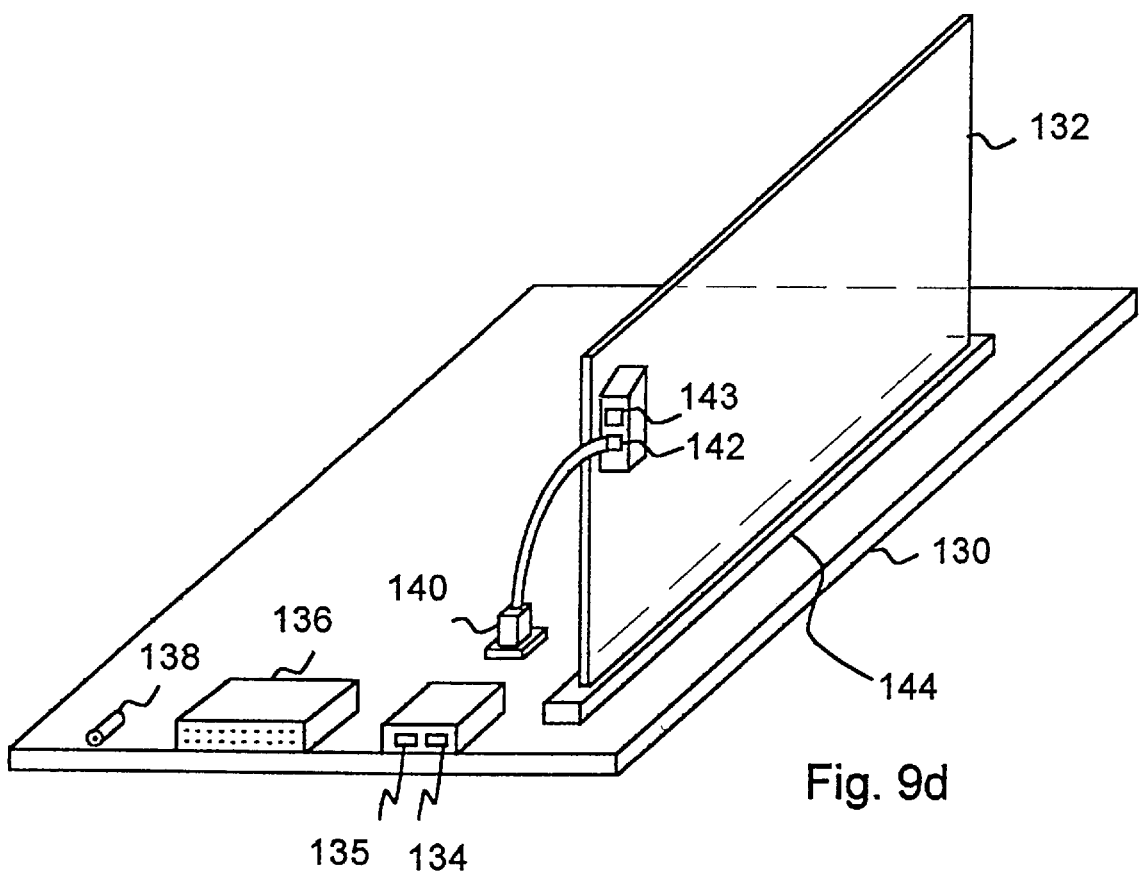

In yet another embodiment of the invention, referring to FIG. 9d, the e-mail device 130 is a stand-alone card having an slot connector 144 able to receive a regular fax/modem card 132. The e-mail device has a connector 138 for receiving ac or dc power supply, a communication port 136 (such as a serial port), and a phone jack for receiving a phone line 134 and also a jack for passing a phone signal to another device 135. Likewise, the fax/modem card 132 has a jack for receiving a phone signal 142 and a jack for passing through a phone signal 143. This embodiment can be placed in a physical box.

Further note that although the e-mail device is illustrated as an expansion card it can be easily converted into an external device like that of the common external fax/modem device. Moreover, the expansion card can be converted to a stand alone device with a display. Moreover, communication devices are not limited to the fax/modem devices illustrated above. ISDN devices, cable modem, wireless modem, or other communication devices can be used as communication devices as well.

Figure 10:
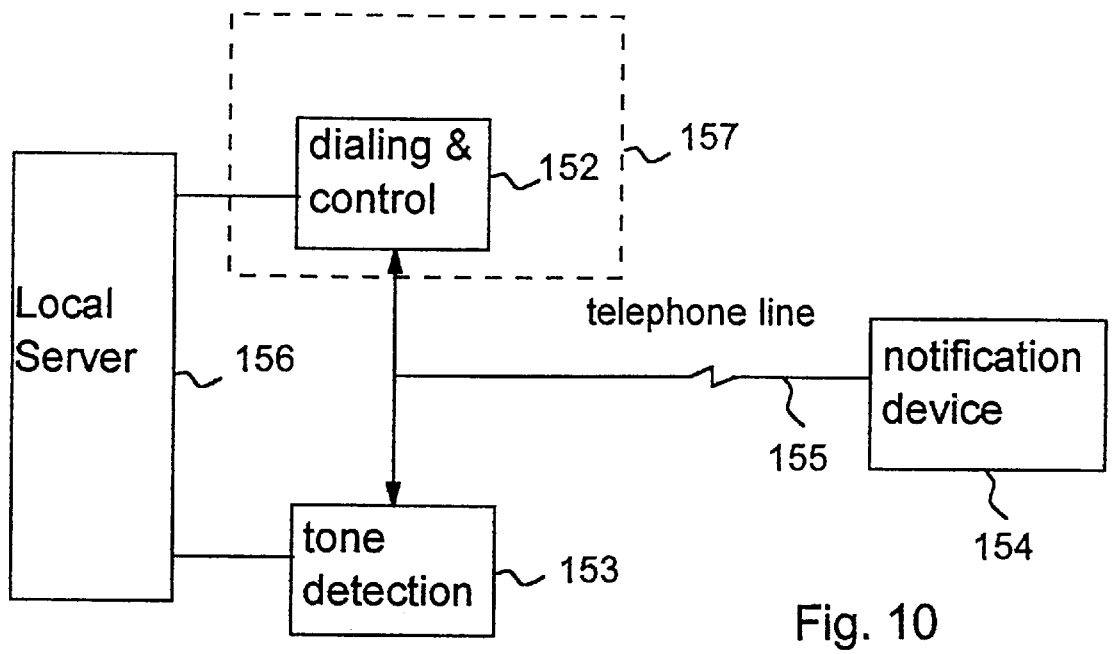
FIG. 10 illustrates a block diagram of the components in implementing the ringing protocol on the local server side.

The hardware embodiment for implementing the ringing protocol described above requires a tone detection circuit. Referring to FIG. 10, on the local server side, the local server provides the dialing and answering functionalities 152 through the use of a modem 157 or other communication devices or modules. The modem controls the phone line 155 to dial the telephone number of the client's e-mail device, and the tone detection circuit 153 detects the ringing tone and reports it to the local server 156. The local server determines the length of ringing time and instructs the modem to disconnect when the predetermined period of time has been reached.

Figure 11:
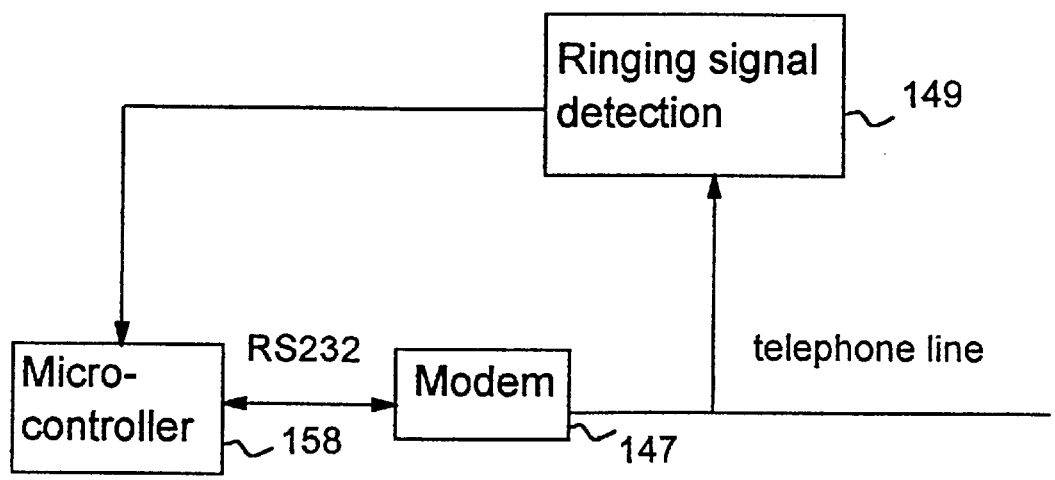
FIG. 11 illustrates a block diagram of the components in implementing the ringing protocol on the e-mail device side.

On the client e-mail device end, the notification device 54 detects the ringing signal, the time lapsed for each ringing signal and the time lapsed between the signals. It then determines whether a valid notification code has been received. Referring to FIG. 11, on the client side, the microcontroller 158 operates a ringing signal detection circuit 149 and a modem 147 in detecting whether a valid ringing code has been received.

Integration of the E-Mail Device

Figure 12:
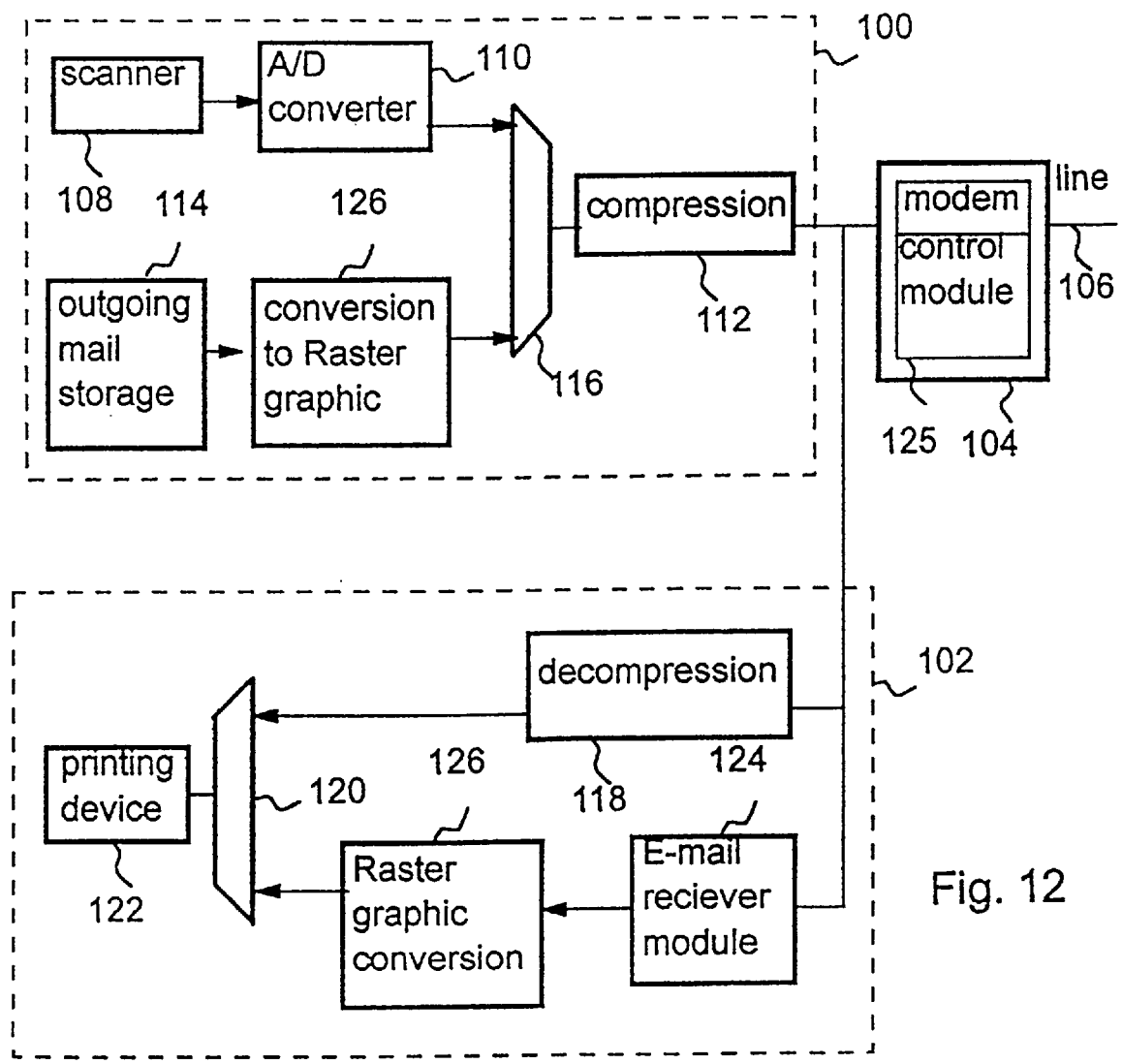
FIG. 12 illustrates a block diagram of an integration of a faxing device and the e-mail device.

The above described e-mail device may be integrated into other devices. For example, the e-mail device may be part of a phone, a fax machine, an answering machine, etc. If the e-mail device is integrated with a fax machine, e-mail messages can be readily printed out and any outgoing mail messages may be composed through the use of the numeric keypad. FIG. 12 illustrates one embodiment of the e-mail device integrated with a fax machine. In this embodiment, there is a transmitter subsystem 100, a receiver subsystem 102, and a modem 104 that can be connected to a telephone line 106. The modem incorporates a control module 125 to execute the ringing protocol described above and distinguishes a fax/modem signal from an e-mail message signal (or protocol) to activate the corresponding portion of the circuitries.

The transmitter 100 can process two signals, one signal for faxing and one signal for mailing messages. For faxing a document, the document is first scanned by a scanner 108 and the scanned signal is converted to a digital format 110. For mailing messages, the prepared mail messages are stored in memory 114 and converted to raster graphic image 126. Note that a number of methods are available for composing mail messages, including the use of a keyboard, a keypad, etc. The composed messages are then stored in memory. A multiplexer 116 selects one of the two signals to pass through to the compressor 112 and then to the modem 104 for transmission in accordance with the selected mode.

The receiver subsystem 102 processes incoming fax signal or mail message signal. For a fax signal, the signal is decompressed 118 and sent to the printing subsystem 122 through a multiplexer 120. For an e-mail message signal, the signal is received and processed by an integrated e-mail device (and software) 124 as described above. The output from the e-mail device is converted to image format 126 and sent to the printing subsystem 122 via the multiplexer 120. Again, the multiplexer selects the signal to be sent to the printing subsystem in accordance with the selected mode.

REMOTE CONTROL OF THE SERVERS

Figure 13:
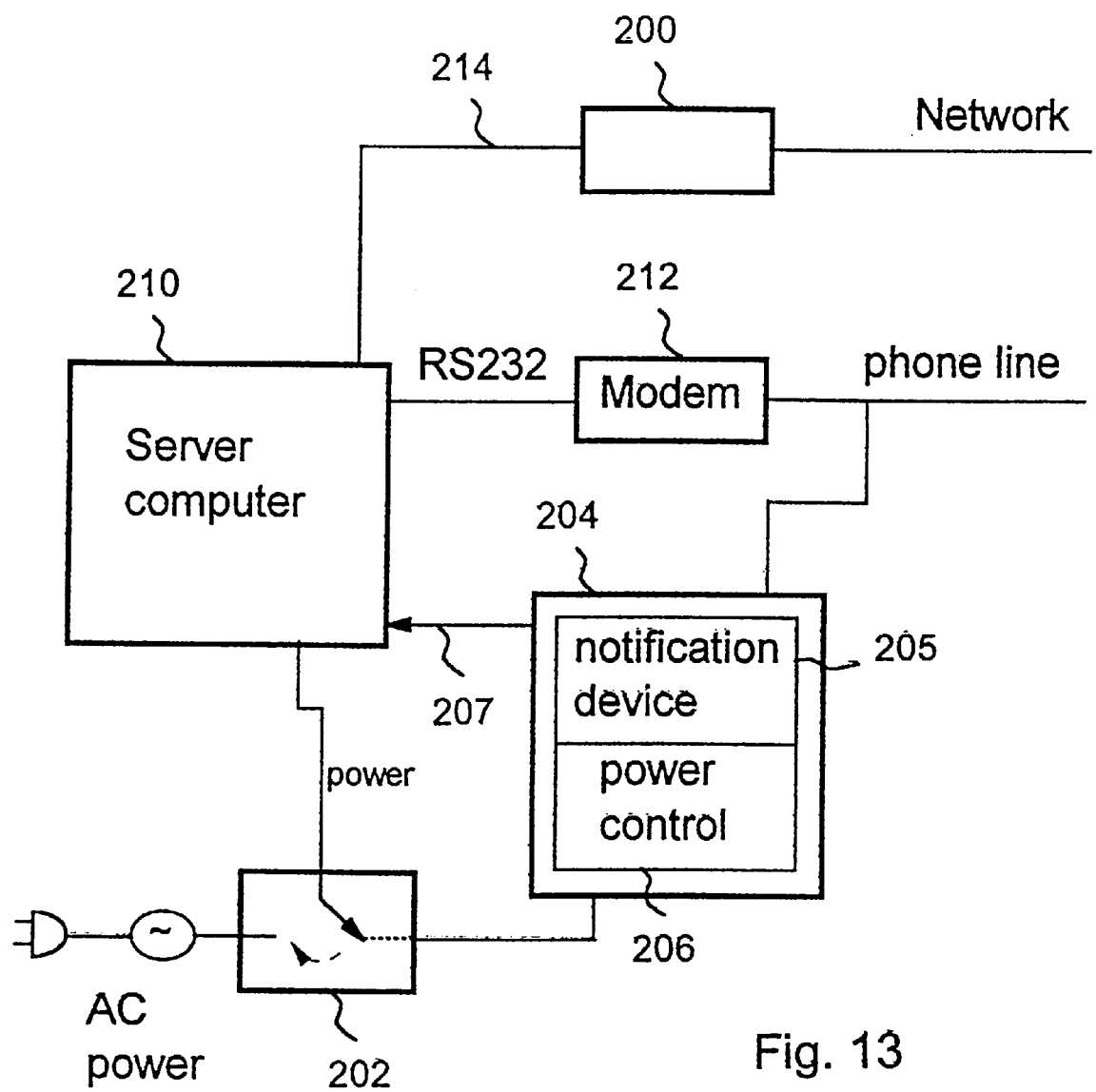
FIG. 13 illustrates a configuration for remote-controlling a server computer using the ringing protocol of the present invention.

The servers can be remotely operated and control by using commercially available communication software or tailored software. The ringing protocol may be used to set and reset the servers. Appendix B illustrates one set of pseudo-code for remote controlling the servers. Referring to FIG. 13, the server computer 210 is connected to the network 200 via a direct connection 214 and through a modem 212. The modem provides a remote login path to the server in order to control or maintain the server. If the server does not respond to the remote login, the ringing protocol of the present invention embodied in the notification device 205 can be used to detect ringing pattern. Upon receiving a proper ringing pattern, the notification device sends a signal to the server computer via line 207 to prepare for shut-down and a signal to the power control module 206 to generate a pulse to toggle the relay 202 for a proper period of time to reboot the computer.

The software described herein for implementation of the e-mail system can be written specifically for this particular application in the programming language of choice. It can also be implemented through the use of existing system mail utility programs. For example, under the Unix system, an entire set of mail utility programs are available for the sending and receiving of mail messages.

Although the present invention has been described in terms of the presently preferred embodiment, it is to be understood that such disclosure is not to be interpreted as limiting. Various alterations and modifications will no doubt become apparent to those skilled in the art after reading the above disclosure. Accordingly, it is intended that the appended claims be interpreted as covering all alterations and modifications as fall within the true spirit and scope of the invention.

APPENDIX A

```
Client software codes on communication card or on a stand alone
system
Kernel
    POST (Power on self-test)
    If fatal failure, go to Fatal_Error_Stop
    If minor failure, go to Warning_code
    Check line status; if busy, wait until line is not busy;
    Set up communication module in auto-answer mode
    Set up other I/O registers, devices
    If any failure, go to Warning_code
Loop Polling interrupt
    If interrupt found, jump to Interrupt_service
    go to loop
Fatal_Error_Stop:
    set error indicator or display
    Holt
Warning_code: (input: warning code)
    set warning indicator (or display)
    return
Interrupt_Service:
```

APPENDIX A

```
        Read interrupt register
        Check the interrupt type
        case of:
             Call_back: jump to Call_server
             Registration request: jump to Reg_req
             Incoming_mail: jump to In_mail
             Dial_server: jump to Call_server
             Transfer_abort: jump to Tfr_abort
        end case:
        Clear the interrupt that has been serviced
        return
Call_server:
        set up communication module to dial
        read_server_number
        dial (phone)
        In_mail;
        return
Bye:
        hangup
        set up communication module in auto answer mode
        return
In_mail:
        Handshaking
sendM   send outgoing mail
        receive transfer confirm info.
        If confirmation info not correct, go to sendM to retry
        send available storage size
revM    receive incoming mail
        send receive confirmation info
        If confirmation info is not correct go to revM
        set Mail_in indicator
        return
Handshaking:
        check the security code, if not correct, go to Bye
        receive machine ID from server (if it is used)
        check the machine ID, if not correct, go to Bye
        return
Reg_req:
        dial the (800) number
        establish connection
        display greeting
        send machine ID
        send security codes
        echo the security code
        print "enter your phone number"
        read phone_number
        send phone number
        receive and save local server number(s)
        print "registration done"
        return
Tfr_abort:
        save all data for immediate disconnection
        hangup
        return
```

APPENDIX B

```
Remote monitor and control of the local server
{ Codes for every local server }
Program diag_report;
begin
     Do the following every hour
         begin
             run_diagnostics_and log results
             check any problem
             mail the report to the main server
         end
end
{ Codes on main server }
Program remote_monitor;
begin
Do the following for every hour
     begin
     get_new_mail:      //the mail are diag report from local server
     if there is mail
         begin
         check the report from each local server
         if there is a problem
             begin
             remote_dia_contrl: //reference point
             rlogin local server //remote login & run diag.
             if rlogin fail goto cold_boot
             run more extensive diagnostics
             if the problem is correctable correct the program
             else reboot //(software warmboot)
                 begin
                 wait for reboot;
                 rlgoin local server
                 if rlogin fail goto cold_boot
                 if system is okay, exit
                 else
                     begin
cold_boot:           remote_shutdown_process     (n,m);
                     //hardware cold boot
                     // n,m are the secret code like
                     notification device
                     wait for reboot
                     rlgin local server
                     if system is okay, exit
                     else report problem to operator
                     end
                 end
             else
             if it is too long for not receiving mail
                 begin
                 rlogin the local server
                 go to remote_dia_contrl
                 end
         end
     end
{ The remote shutdown process uses a method similar to the
notification device, but it requires much higher security in
order to prevent unauthorized shutdown. So, the following
procedure uses two codes instead of one code. Again the code
represents the ring tone length difference for two consecutive
dialings. The first code n is for the difference between the
ringing period of the first call x1 and the second call x2, and
m is for the difference between x2 and the ringing period of the
third call x3. Typically, n and m are small numbers which can
be positive or negative numbers. More codes can be used to
achieve even greater security.}
process remote_shutdown_process (n,m);
begin
     start_point;       //just a reference point
     call (phone_number)
         if line busy, wait and go to start_point
     detect_ring_tone for x1 second
     disconnect;
     wait w1 seconds;
     call (phone_number)
         if line busy, wait and go to start_point
     detect_ring_tone for x2 second //x2=x1+n
     disconnect
     wait w1 seconds;
     call (phone_number) ;
         if line busy, wait and go to start_point
     detect_ring_tone for x3 seconds //x3=x2+m
     disconnect;
end
```

What I claim is:

1. A method for sending and receiving electronic mail messages over an interconnected network of computers where one of said interconnected computers is configured to receive mail messages having a domain address, said configured computer electronically connected to one or more mail servers each electronically connected to one or more electronic mail messaging devices, wherein each of the electronic mail messaging devices is assigned a particular address within said domain address for receiving electronic mail messages addressed to said particular address, said method comprising the steps of:

receiving one or more electronic mail messages each addressed to a particular address within said domain address; and electronically notifying by a mail server to an electronic mail messaging device having an address corresponding to the address of the one or more to-be-delivered electronic mail messages by having said mail server dialing a phone number corresponding to a telephonic connection to the electronic mail message device using a particular dialing and ringing pattern without establishing a telephonic connection for transference of messages between said mail server and said electronic mail messaging device, wherein said particular dialing and ringing pattern established by the substeps of:

(a) dialing and ringing said telephonic connection for a first predetermined time period without establishing a connection for transference of said mail messages;

(b) hanging-up said telephonic connection after said first predetermined time period;

(c) pausing for a first waiting period;

(d) dialing and ringing said telephonic connection for a second predetermined time period without establishing said telephonic connection; and (e) hanging-up said telephonic connection after said second predetermined time period.

2. A method as recited in claim 1 further including the steps of:

reserving a copy of each mail message at said configured computer before sending the mail messages to the corresponding mail servers; and sending a confirmation message from each mail server to said configured computer upon successful completion of the delivery of the electronic mail messages.

3. A method as recited in claim 2 further including the step of returning a failed-delivery message from a mail server to said configured computer upon the failure of delivering the electronic mail messages.

4. A method as recited in claim 1 further includes the steps of:

electronically connecting said mail servers and said electronic mail messaging device;

exchanging communication protocol between said mail server and said electronic mail messaging device to initiate the delivery of the electronic mail messages;

receiving by said mail server one or more outgoing electronic mail messages from the electronic mail messaging device; and sending from said mail server to the electronic mail messaging device the electronic mail messages.

5. A method as recited in claim 4 wherein said connecting step is accomplished by having said mail server dialing a phone number corresponding to a telephonic connection to the electronic mail messaging device and establishing a telephonic connection to permit transference of messages between said mail server and said electronic mail messaging device.

6. A method as recited in claim 1 further includes the substeps of:

(f) pausing for a second waiting period;

(g) dialing and ringing said telephonic connection for a third predetermined time period without establishing said telephonic connection; and (h) hanging-up said telephonic connection after a third predetermined time period.

7. A method as recited in claim 1 wherein said electronic mail messaging device is programmed to call the mail server after receiving said particular dialing and ringing pattern.

8. A method as recited in claim 1 wherein said electronic mail messaging device activates an indicator after receiving said particular dialing and ringing pattern to indicate that there are electronic mail messages at the mail server for retrieval.

9. A method as recited in claim 4 further including the step of verifying the storage capacity of the electronic mail messaging device before sending the electronic mail messages to said electronic mail messaging device and retaining at the mail server the electronic mail messages exceeding the storage capacity of the electronic mail messaging device.

10. A method as recited in claim 1 wherein said configured computer and the mail servers may be remotely operated via an electrical connection and a computer.

11. A method as recited in claim 1 wherein said configured computer and the mail servers may be remotely operated via an electronic connection, a computer, and through the use of a particular dialing and ringing pattern.

12. A method for sending and receiving electronic mail messages over an interconnected network of computers where one of said interconnected computers is configured to receive mail messages having a domain address, said configured computer electronically connected to one or more mail servers each electronically connected to one or more electronic mail messaging devices, wherein each of the electronic mail messaging devices is assigned a particular address within said domain address for receiving electronic mail messages addressed to said particular address, said method comprising the steps of:

receiving one or more electronic mail messages each addressed to a particular address within said domain address; and electronically notifying by a mail server to an electronic mail messaging device having an address corresponding to the address of the one or more to-be-delivered electronic mail messages by having said mail server dialing a phone number corresponding to a telephonic connection to the electronic mail message device using a particular dialing and ringing pattern without establishing a telephonic connection for transference of messages between said mail server and said electronic mail messaging device, wherein said particular dialing and ringing pattern established by the substeps of:

(a) dialing and ringing said telephonic connection for a first predetermined time period without establishing a connection for transference of said mail messages;

(b) hanging-up said telephonic connection after said first predetermined time period;

(c) pausing for a first waiting period;

(d) dialing and ringing said telephonic connection for a second predetermined time period without establishing said telephonic connection; and (e) hanging-up said telephonic connection after said second predetermined time period;

electronically connecting said mail server and said electronic mail messaging device;

exchanging communication protocol between said mail server and said electronic mail messaging device to initiate the delivery of the electronic mail messages;

receiving by said mail server one or more outgoing electronic mail messages from the electronic mail messaging device; and sending from said mail server to the electronic mail messaging device the electronic mail messages.

13. A method as recited in claim 12 further including the steps of:

reserving a copy of each mail message at said configured computer before sending the mail messages to the corresponding mail servers; and sending a confirmation message from each mail server to said configured computer upon successful completion of the delivery of the electronic mail messages.

14. A method as recited in claim 12 wherein said connecting step is accomplished by having said mail server dialing a phone number corresponding to a telephonic connection to the electronic mail messaging device and establishing a telephonic connection to permit transference of messages between said mail server and said electronic mail messaging device.

15. A method as recited in claim 12 further includes the substeps of:

(f) pausing for a second waiting period;

(g) dialing and ringing said telephonic connection for a third predetermined time period without establishing said telephonic connection; and (h) hanging-up said telephonic connection after a third predetermined time period.

16. A method as recited in claim 12 wherein said electronic mail messaging device is programmed to call the mail server after receiving said particular dialing and ringing pattern.

17. A method as recited in claim 12 wherein said electronic mail messaging device activates an indicator after receiving said particular dialing and ringing pattern to indicate that there are electronic mail messages at the mail server for retrieval.

18. A method as recited in claim 12 wherein said configured computer and the mail servers may be remotely operated via an electronic connection, a computer, and through the use of a particular dialing and ringing pattern.

19. A method for sending and receiving electronic mail messages over an interconnected network of computers where one of said interconnected computers is configured to receive mail messages having a domain address, said configured computer electronically connected to one or more mail servers each electronically connected to one or more electronic mail messaging devices, wherein each of the electronic mail messaging devices is assigned a particular address within said domain address for receiving electronic mail messages addressed to said particular address, said method comprising the steps of:

receiving one or more electronic mail messages each addressed to a particular address within said domain address; and electronically connecting from one of the mail servers to an electronic mail messaging device having an address corresponding to the address of the one or more to-be-delivered electronic mail messages, wherein said mail server dialing a phone number corresponding to a telephonic connection to the electronic mail message device using a particular dialing and ringing pattern without establishing a telephone connection for transference of messages between said mail server and said electronic mail messaging device, wherein said particular dialing and ringing pattern established by the substeps of: (a) dialing and ringing said telephonic connection for a first predetermined time period without establishing a connection for transference of said mail messages; (b) hanging-up said telephonic connection after said first predetermined time period; (c) pausing for a first waiting period; (d) dialing and ringing said telephonic connection for a second predetermined time period without establishing said telephonic connection; and (e) hanging-up said telephonic connection after said second predetermined time period;

exchanging communication protocol between said mail server and said electronic mail messaging device to initiate the delivery of the electronic mail messages;

receiving by said mail server one or more outgoing electronic mail messages from the electronic mail messaging device; and sending from said mail server to the electronic mail messaging device the electronic mail messages.

20. A method as recited in claim 19 wherein said electronic mail messanging device is programmed to call the mail server after receiving said particular dialing and ringing pattern.

21. A method as recited in claim 19 wherein said electronic mail messaging device activates an indicator after receiving said particular dialing and ringing pattern to indicate that there are electronic mail messages at the mail server for retrieval.

* * * * *